United States Patent
Feng et al.

(10) Patent No.: US 7,499,636 B2
(45) Date of Patent: Mar. 3, 2009

(54) METHOD FOR AUTOMATICALLY COORDINATING FLASH INTENSITY AND CAMERA SYSTEM AS THE SAME

(75) Inventors: Wang Chang Feng, Hang-zhou (CN); Du Wei Jia, Hang-zhou (CN)

(73) Assignee: Asia Optical Co., Inc, Taichung (TW)

(*) Notice: Subject to any disclaimer, the term of this patent is extended or adjusted under 35 U.S.C. 154(b) by 629 days.

(21) Appl. No.: 11/158,057

(22) Filed: Jun. 22, 2005

(65) Prior Publication Data
US 2006/0165399 A1 Jul. 27, 2006

(30) Foreign Application Priority Data
Jan. 26, 2005 (TW) .............................. 94102353 A

(51) Int. Cl.
*G03B 15/02* (2006.01)

(52) U.S. Cl. .......................... 396/61; 396/80; 396/104; 348/224.1; 348/371

(58) Field of Classification Search .................. 396/61, 396/80, 104, 121, 429; 348/224.1, 371
See application file for complete search history.

(56) References Cited

U.S. PATENT DOCUMENTS

| 4,329,031 A | | 5/1982 | Carcia et al. | |
| 5,687,409 A | * | 11/1997 | Miyamoto | 396/290 |
| 5,966,550 A | * | 10/1999 | Oono et al. | 396/82 |
| 6,272,292 B1 | * | 8/2001 | Iwasaki et al. | 396/157 |

FOREIGN PATENT DOCUMENTS

| CN | 1090064 | 7/1994 |
| CN | 2426157 | 4/2001 |
| WO | 2004014667 | 12/2004 |

* cited by examiner

*Primary Examiner*—W. B. Perkey
*Assistant Examiner*—Warren K Fenwick

(57) ABSTRACT

A camera system with function of automatically coordinating flash intensity includes a lens, an image sensor, a focus system, a focus sensor and a control unit. The lens controls light amount that entrance into camera. The focusing system drives the lens to focus thereby forming a clear image on the image sensor. The focus sensor senses first step information of the focusing system during the focusing process, and sending the information to a control unit. The control unit transforms the result of the focusing system to a distance that the object apart from the camera, and configures out the guide number with the aperture number thereby calculating the flash intensity. The present camera systems may measure the distance that the objects apart from the camera, and low down the cost and power consumption. The camera systems may also precisely control the flash intensity thereby coordinating the exposure effect.

18 Claims, 3 Drawing Sheets

METHOD FOR AUTOMATICALLY COORDINATING FLASH INTENSITY AND CAMERA SYSTEM AS THE SAME

BACKGROUND OF THE INVENTION

1. Field of the Invention

The present invention relates to a method for automatically coordinating flash intensity and camera system as the same, particularly to a method for automatically coordinating flash intensity in accordance with the distance, the luminance and other parameters.

2. Description of the Related Arts

Flash devices are usually equipped with digital cameras, which provide additional light while the objects are not illuminated enough. In operation, different flash modes are applied to adjust the flash parameters. A manual flash mode and an auto flash mode are known as two generally used flash modes. When the flash device is in a manual flash mode, the flash flashes immediately after a shutter curtain is fully opened. The parameters, such as flash intensity and flash duration, are set prefirst. When the object is in another different condition, for example, the distance between the object and the camera has increased, or the luminance of the object has decreased, the camera cannot coordinate itself according to the changes of environment, and the parameters are need to be manually adjusted. However, general customers without skilled technology cannot finish it, so most of the present cameras utilize the auto flash mode. In the auto flash mode, the camera calculates the distance that the objects apart from the camera and the luminance of the objects to coordinate the flash intensity and flash duration. The relationship between the parameters is given below:

$$GN = A * L \quad (1)$$

Where GN represents a guide number of the flash; A represents an aperture of the camera; L represents a distance objects against the camera. The GN is a certain scale for luminance that the flash has emitted, and it's an important parameter to estimate the performance of the flash. The unit of the GN is meter.

For measuring the distance from the object to camera, a distance measure unit and a photo-sensor unit are two kinds of generally used ways. The distance measure unit is a professional measuring instrument, which sends light to the object, calculates the flight time until it receives the reflected light, and multiplies the time to the speed that the light transmits, thereby working out the distance. Cameras with the distance measure units may precisely measure the distance, however, it's too expensive for general customers. Meanwhile, though the cameras with the photo-sensor unit to measure the distance will be much cheaper, it's much poor in precision. When operating, the flash pre-flashes, the camera receive the reflected light from the object, judge whether the object is illuminated enough. The camera compares a reference exposure value with the present and works out the distance that the camera against the object. Although the cameras with photo-sensor units to measure may be much cheaper than ones with distance measure units, a pre-flashing design may exhaust the power, which bring in another problem.

Therefore, it's essential to support a new method for the camera to adjust the parameters of the flash without above-mentioned shortcomings.

BRIEF SUMMARY OF THE INVENTION

An object of the present invention is to provide an improved method for automatically coordinating flash intensity and camera system as the same, with which the camera can control and coordinate the flash intensity precisely with low power and low cost.

The method for automatically coordinating flash intensity in camera in accordance with the present invention, comprising:

a) focusing a camera lens on an object until the object is clearly appeared on an image sensor;

b) sending first step value that a focus sensor has sensed during the focusing process to a control unit, the control unit transforming the first step value to distance information that the object apart from the camera; and c) confirming the aperture of the camera by the distance, and calculating a guiding number thereby confirming a flash duration to coordinate the performance of the flash.

According to the method for automatically coordinating flash intensity in camera, a step-distance table is pre-stored in the control unit for transforming the first step information to the distance information.

According to the present method, a camera system comprises a lens, an image sensor, a focus system, a focus sensor and a control unit. The lens is capable of controlling light amount that enters into camera. The focusing system is capable of driving the lens to focus thereby forming a clear image on the image sensor. The focus sensor is capable of sensing first step value of the focusing system during the focusing process, and sending the value to a control unit. The control unit is capable of transforming the result of the focusing system to a distance that the object apart from the camera, and configures out the guide number with the aperture number thereby calculating the flash intensity.

To compare with the conventional invention, the present invention establishes a relationship table to confirm the parameters of the flash. When the camera focusing on the object, the focus sensor senses the steps that the focus motor has worked. With the step result, the control unit may find out the present distance that the object apart from the camera thereby working out the guide number to coordinate the aperture. The present camera systems without neither a professional measurement tool nor an additional pre-flash, may measure the distance that the objects apart from the camera, and low down the cost and power consumption. The camera systems may also precisely control the flash intensity thereby coordinating the exposure effect.

Other objects, advantages and novel features of the invention will become more apparent from the following detailed description of a preferred embodiment when taken in conjunction with the accompanying drawings.

BREIF DESCRIPTION OF THE DRAWINGS

DETAILED DESCRIPTION OF THE PREFFERRED EMBODIMENTS

Figure 1:
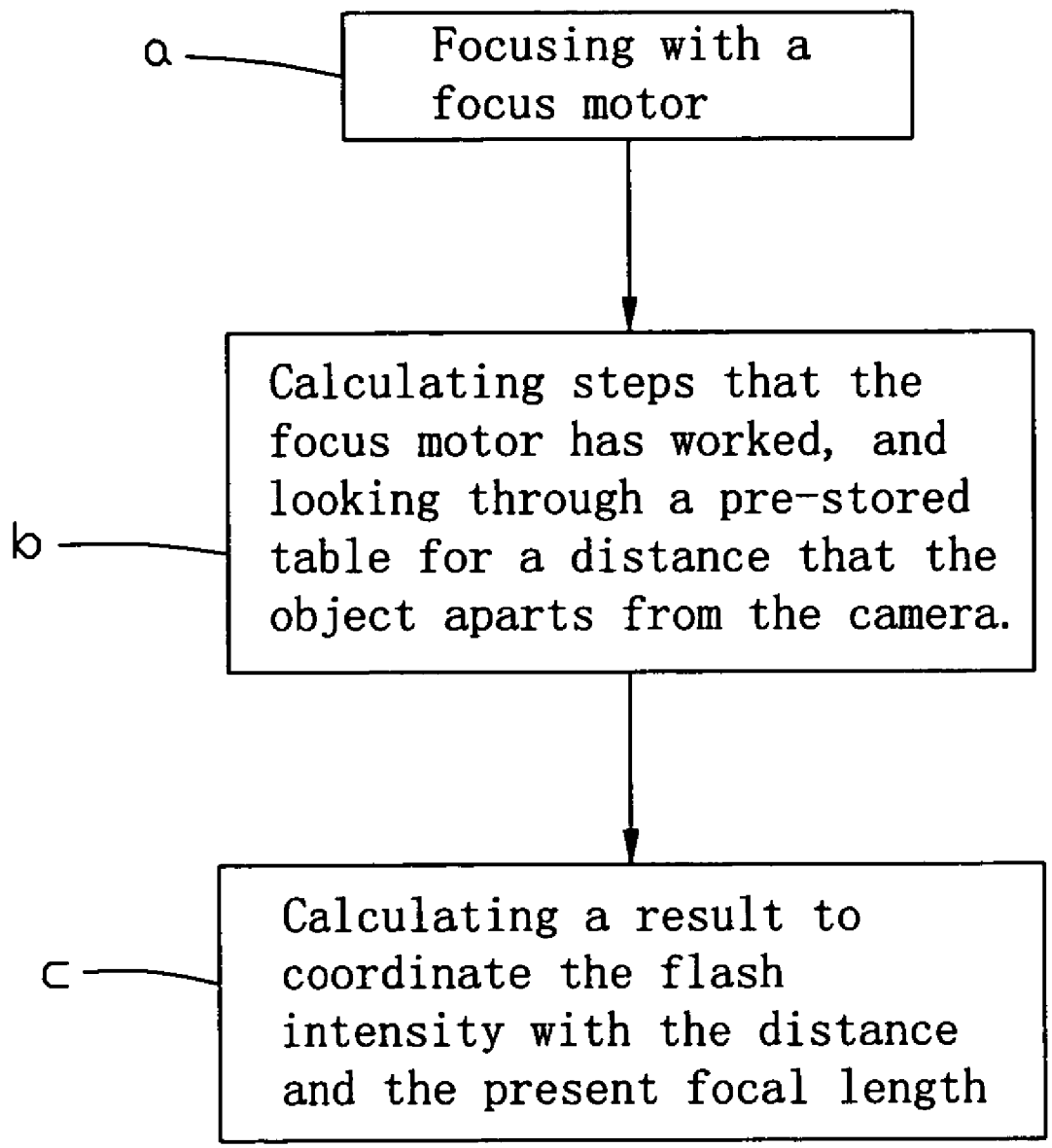
FIG. 1 is a flow chart according to the present invention, showing a camera automatically coordinating flash intensity.

A zoom digital camera is taken to explain the present invention. Referring to FIG. 1, a method for automatically coordinating flash intensity according to the present invention, comprises:

Step a, focusing with a focus motor. The focus motor is actually a step motor, which is capable of providing uniform momentum at intervals and driving the subject moving at steps. The focus motor drives a lens to enable the movement of it. In operation, the lens shoots at the object. The camera controls the focus motor to drive the lens, and judges whether the image is clearly appeared on a screen.

Step b, calculating steps that the focus motor works, and looking through a pre-stored table for a distance that the object apart from the camera. The pre-stored table relates to a relationship of the corresponding step-distance, of which the "step" represents a first step value, which is how many steps the focus motor has worked, and the "distance" represents how far the object apart from the camera. When the image is clearly appeared, a focus sensor senses the "step" and sent it to a control unit. The control unit calculates the "distance" by comparing the first step value with the pre-stored table in it.

Step c, calculating a result to coordinate the flash intensity with the distance and the present focal length.

Figure 2:
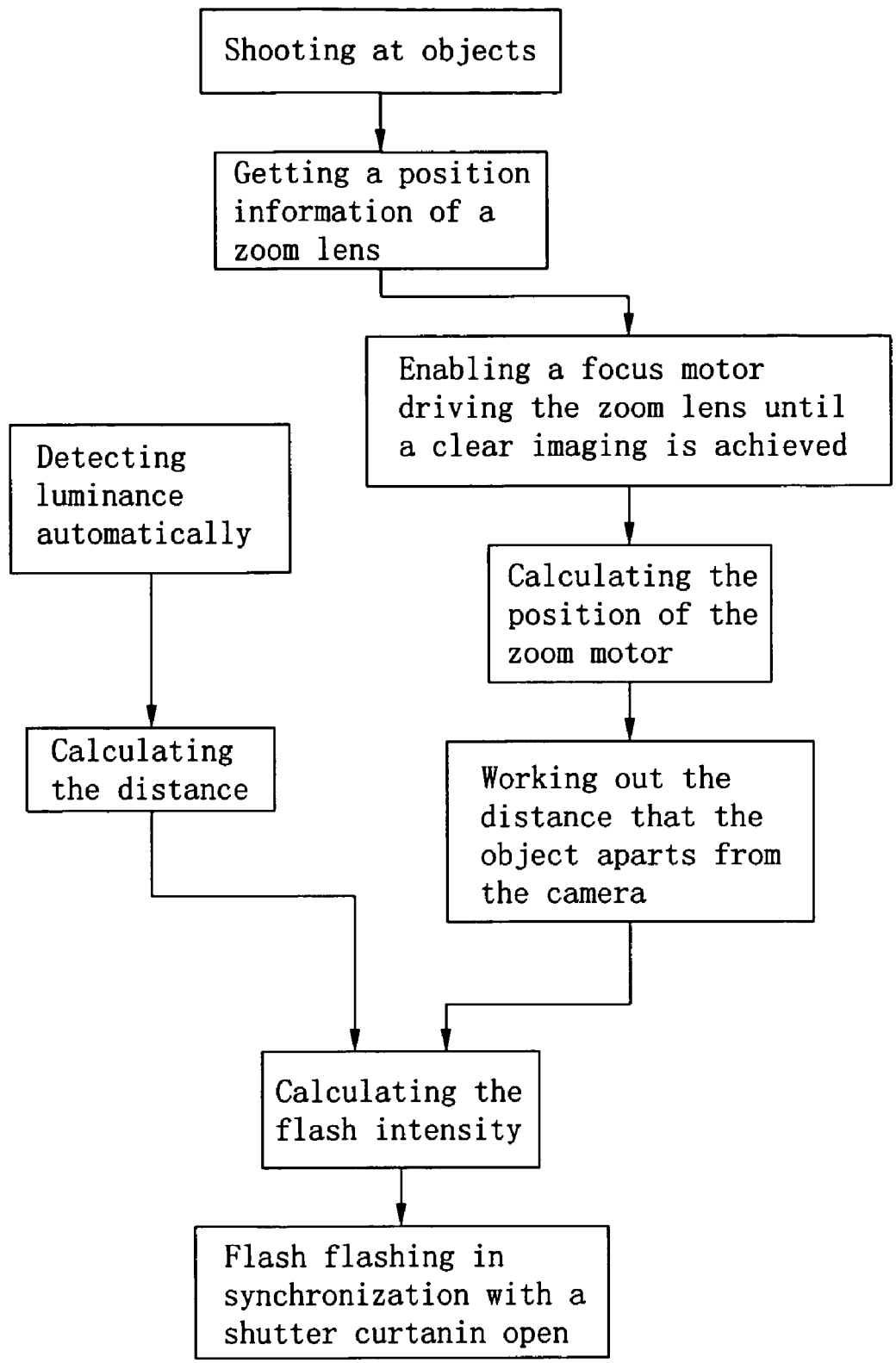
FIG. 2 is a flow chart showing an applying of the present invention in zoom camera.

Also referring to FIG. 2, a flow chart of the present invention when applying to a zoom digital camera is shown. A zoom motor is controlled to driver the zoom lens on an axis to coordinate the focal length. Second step value that the zoom motor has worked during the process of coordination is transformed to position information of the zoom lens. The position information is sensed by a zoom sensor and is sent to a control unit. A table relating to a relationship of the position-focal length is pre-stored in the control unit, wherein a present focal length may be achieved by comparing the pre-stored table with the position result. An aperture is achieved by the following expression:

$$A = F/D \qquad (2)$$

Where A represents the aperture, F represents the focal length, and D represents an F-stop. The focus motor is controlled to drive the lens until an image of the object is clearly appeared. The focus sensor senses the first step value that the focus motor has worked and sent the first step value to the control unit. The distance may be achieved by comparing the first step value with the pre-stored step-distance table. The control unit then works out a guide number and a flash duration with the distance information, the aperture, and the expression (1), and coordinates the flash with these parameters.

The referred pre-stored step-distance table in control unit can be achieved by times of experiments. The step-distance table according to a certain digital camera is described in a following table-1.

TABLE-1

| Zoom Lens | Zoom ratio Aperture | Step and the corresponding distance | | | | | | | | | | | | |
|---|---|---|---|---|---|---|---|---|---|---|---|---|---|---|
| f (mm) | Open | Contract ∞ | | | 5 m | 2 m | 1.5 m | 1 m | 0.8 m | 0.6 m | 0.5 m | 0.4 m | 0.3 m | 0.0993 m |
| f1 | 1.00 | 6.000 | 2.91 | 4.76 | 123 | 126 | 129 | 131 | 134 | 137 | 141 | 145 | 151 | 161 | 264 |
| f2 | 1.27 | 7.621 | 3.22 | 5.27 | | 82 | 86 | 91 | 94 | 100 | 105 | 112 | 119 | 128 | 144 |
| f3 | 1.54 | 9.252 | 3.52 | 5.77 | | 49 | 54 | 62 | 67 | 76 | 83 | 94 | 103 | 117 | 141 |
| f4 | 1.89 | 11.353 | 3.91 | 6.41 | | 16 | 24 | 37 | 44 | 58 | 68 | 85 | 99 | 120 | 156 |
| f5 | 2.29 | 13.731 | 4.35 | 7.11 | | −10 | 2 | 21 | 31 | 52 | 67 | 92 | 112 | 142 | 191 |
| f6 | 2.80 | 16.797 | 4.90 | 8.00 | | −27 | −7 | 20 | 36 | 66 | 88 | 124 | 152 | 194 | 262 |

As is described in the table-1, the second step value that the zoom motor has worked corresponds with the positions of the zoom lens, which alternates from f1 to f6 between "tele" and "wide". A certain position of the zoom lens thereby confirms a corresponding focal length and aperture. Each focal length corresponds a plurality of corresponding first step value that the focus motor has worked and distance. The distance that the object against the camera is determined on the basis of the focal length and the first step value. In operation, the relationship table is pre-stored in the control unit, the second step value is achieved with the zoom sensor, and the distance may be found out in the relationship table with the first step value. In another hand, the second step value of the zoom motor confirms the position of the zoom lens. The position of the zoom lens confirms a corresponding focal length and aperture in the relationship table. Therethrough, the control unit may calculate the guide number with expression (1) to coordinates the flash intensity.

For a fixed focal lens camera, as the focal length is unchangeable, the distance that the object apart from the camera may be found out in the relationship table with the first step value. With these parameters, the control unit may calculate the guide number to coordinate the flash. It will be understood that it is more proper for the present invention to apply in a fixed focal lens camera, since the present invention is advanced in reduce the cost and power cost.

The method for automatically coordinating flash intensity in accordance with the present invention further comprises a step of luminance detection. The luminance detection is to detect the luminance information of environment objects with an Automatic Exposure, and the detected luminance information is sent to the control unit. A reference value of the luminance is pre-stored in the control unit and is used to compare with the detected luminance information. Then, the control unit coordinates the flash intensity with the compare result.

Figure 3:
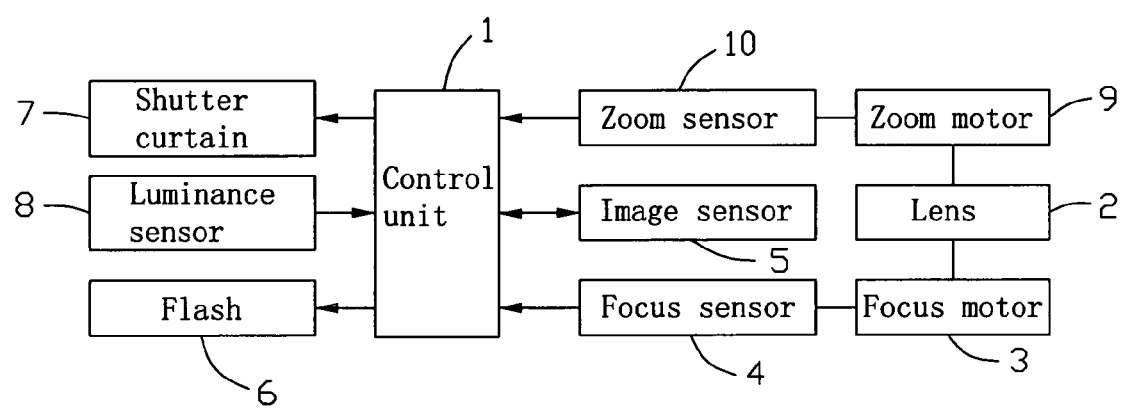
FIG. 3 is a block diagram showing a structure of a camera with a function of automatically adjusting the flash intensity.

Referring to FIG. 3, a block diagram of structures of a camera system with the function of automatically adjusting the flash intensity is shown. The camera is composed of a control unit 1, a lens 2, a focus motor 3, a focus sensor 4, an image sensor 5, and a flash 6. The lens 2 may coordinate the aperture to control the light amount that enters the camera. The control unit 1 guides the focus motor 3 to drive the lens 2 to focus until a clear image appeared on the image sensor 5 is achieved. The focus sensor 4 senses the first step value that the focus motor 3 has worked when it is adjusting the focal length, and the first step value is sent to the control unit 1. A table is pre-stored in the control unit 1, which relates to relationships of the first step value that the focus motor 3 has worked and the distance that the object apart from the camera. Parameters such as aperture of the lens 2, flash intensity and guide number of the flash 6, may be correspondingly found out in the table. These parameters are used to control the flash 6 to ensure proper light amount that the flash 6 flashes in synchronization with a shutter curtain 7 opening.

The camera system also comprises a luminance sensor 8, which senses the luminance information of surrounding objects and sends the luminance information to the control unit 1. A reference value of the luminance is pre-stored in the control unit 1, and the luminance information that the luminance sensor 8 sensed is used to compare with the reference value for coordinate the flash intensity.

While a zoom camera is referred, the camera system further comprises a zoom motor 9 and a zoom sensor 10. The zoom motor 9 may drive the lens 2 to coordinate the focal length. The zoom sensor 10 senses the second step value that the zoom motor 9 has worked and sends the value to the control unit 1. The control unit 1 finds out the corresponding distance with the pre-stored step-distance table thereby configuring out the aperture of the camera.

The present invention as is described hereinabove substantially makes use of the step-distance table to confirm the parameters of the flash. When the camera focusing on the object, the focus sensor senses the first step value that the focus motor has worked. With the step result, the control unit may find out the present distance that the object apart from the camera thereby working out the guide number to coordinate the aperture. The present Camera systems without neither a professional measurement tool nor an additional pre-flash, may easily measure the distance that the objects apart from the camera, and low down the cost and power consumption. The camera systems may also precisely control the flash intensity thereby coordinating the exposure effect.

It will be understood that the focus sensor 4 (the zoom sensor 10 as well) and the control unit 1 may actually be a DSP (Digital Signal Processor), and the image sensor 5 may actually be a CCD or CMOS (Complementary Metal Oxide Semiconductor Sensor).

It will be understood that the invention may be embodied in other specific forms without departing from the spirit or central characteristics thereof. The present examples and embodiments, therefore, are to be considered in all respects as illustrative and not restrictive, and the invention is not be limited to the details given herein.

We claim:

1. A method for automatically coordinating flash intensity in camera, comprising:
    a) focusing a camera lens on an object until the object is clearly appeared on an image sensor;
    b) sending a first step value that a focus sensor has sensed to a control unit, the control unit transforming the first step value to a distance information that the object apart from the camera; and
    c) confirming the aperture of the camera by the distance, and calculating a guiding number thereby confirming a flash duration to coordinate the performance of the flash.

2. The method for automatically coordinating flash intensity in camera as claimed in claim 1, wherein a step-distance table is pre-stored in the control unit for transforming the first step value to the distance.

3. The method for automatically coordinating flash intensity in camera as claimed in claim 1, wherein when the method is applied in zoom camera, a zoom sensor senses a position information of a zoom lens, sends the information to the control unit, and the control unit transforms the information to a focal length and calculating the aperture with an expression "A=F/D", of which A represents the aperture, F represents the focal length, and D represents an F-stop.

4. The method for automatically coordinating flash intensity in camera as claimed in claim 3, wherein a position-focal length table is pre-stored in the control unit for transforming the position information to the focal length.

5. The method for automatically coordinating flash intensity in camera as claimed in claim 2 or 4, wherein the method further comprises a step of luminance detection to detect luminance information of environment objects with a luminance sensor, and a detection result is sent to the control unit to compare with a pre-stored reference value, then, the control unit coordinates the flash intensity with the compare result.

6. The method for automatically coordinating flash intensity in camera as claimed in claim 2 or 4, wherein the pre-stored table may be achieved by times of experiments.

7. The method for automatically coordinating flash intensity in camera as claimed in 1 or 3, wherein a CMOS (complementary metal oxide semiconductor sensor) is applied as a focus system, and the said result is a value of steps that the focus/zoom motor has worked.

8. The method for automatically coordinating flash intensity in camera as claimed in 1 or 3, wherein a manual focus system is applied in the camera, and result is a value that how many circles the focus button has turned.

9. A camera system with a function of automatically adjusting the flash intensity, comprising:
    a) a lens capable of controlling light amount that enters into camera;
    b) an image sensor;
    c) a focusing system capable of driving the lens to focus thereby forming a clear image on the image sensor;
    d) a focus sensor capable of sensing first step value of the focusing system during the focusing process, and sending the value to a control unit; and
    e) the control unit capable of transforming the result of the focusing system to a distance that the object apart from the camera, and configuring out the guide number with the aperture number thereby calculating the flash intensity.

10. The camera system with a function of automatically adjusting the flash intensity as claimed in claim 9, wherein a step-distance table is pre-stored in the control unit for transforming the result to the distance that object apart from the camera.

11. The camera system with a function of automatically adjusting the flash intensity as claimed in claim 10, wherein the camera system further comprises a zoom motor for coordinating the focal length of the lens.

12. The camera system with a function of automatically adjusting the flash intensity as claimed in claim 11, wherein the camera system further comprises a zoom sensor for sensing the position of the lens and sending the result to the control unit.

13. The camera system with a function of automatically adjusting the flash intensity as claimed in claim 12, wherein the focal length may be achieved by a pre-stored position-focal length table, so that the control unit capable of calculating the aperture number.

14. The camera system with a function of automatically adjusting the flash intensity as claimed in claim 9 or 13, wherein the camera system further comprises a luminance sensor, which is capable of sensing the luminance of the surroundings and sending the result to the control unit.

15. The camera system with a function of automatically adjusting the flash intensity as claimed in claim 14, wherein a reference luminance value is pre-stored in the control unit for comparing with the luminance result enable the control unit coordinate the flash intensity.

16. The camera system with a function of automatically adjusting the flash intensity as claimed in claim 9 or 13, wherein the table pre-stored in the control unit is achieved by times of experiments.

17. The camera systems with a function of automatically adjusting the flash intensity as claimed in 9 or 13, wherein a CMOS is applied in as a focus system, and the said result is a value of steps that the focus/zoom motor has worked.

18. The camera system with a function of automatically adjusting the flash intensity in claim 9 or 13, wherein a manual focus system is applied in the camera, and result is a value that how many circle s that the focus button has turned.

* * * * *